United States Patent

Schell (10) Patent No.: US 10,033,555 B2
(45) Date of Patent: Jul. 24, 2018

(54) EQUALIZER CIRCUIT OPTIMIZATION USING COARSE FREQUENCY DETECTION

(71) Applicant: Analog Devices, Inc., Norwood, MA (US)

(72) Inventor: Robert Schell, Chatham, NJ (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/265,275

(22) Filed: Sep. 14, 2016

(65) Prior Publication Data

US 2018/0076985 A1    Mar. 15, 2018

(51) Int. Cl.
*H04L 25/03* (2006.01)
*H04L 7/027* (2006.01)

(52) U.S. Cl.
CPC ........ *H04L 25/03057* (2013.01); *H04L 7/027* (2013.01); *H04L 25/0305* (2013.01); *H04L 25/03019* (2013.01); *H04L 25/03159* (2013.01); *H04L 25/03885* (2013.01); *H04L 2025/03592* (2013.01); *H04L 2025/03764* (2013.01)

(58) Field of Classification Search
CPC ......... H04L 25/03885; H04L 25/03019; H04L 25/03159; H04L 2025/03592; H04L 25/0305
See application file for complete search history.

(56) References Cited

U.S. PATENT DOCUMENTS

| | | | |
|---|---|---|---|
| 5,809,072 A | 9/1998 | Zortea et al. | |
| 5,991,339 A | 11/1999 | Bazes et al. | |
| 6,222,876 B1 | 4/2001 | Hirth et al. | |
| 6,546,063 B1* | 4/2003 | Lee ................ | H04L 25/03885 375/232 |
| 6,856,648 B1* | 2/2005 | Hyll ................ | H04L 25/03159 375/232 |
| 7,639,736 B2 | 12/2009 | Farjad-rad | |
| 7,688,887 B2 | 3/2010 | Gupta et al. | |
| 8,045,608 B2 | 10/2011 | Dai et al. | |
| 8,045,609 B2 | 10/2011 | Dai et al. | |
| 8,269,564 B2 | 9/2012 | Lu et al. | |
| 8,396,105 B2 | 3/2013 | Gerfers et al. | |
| 8,396,109 B2 | 3/2013 | Farjad-rad | |
| 8,446,940 B2 | 5/2013 | Farjad-rad | |
| 8,705,606 B2 | 4/2014 | Farjad-Rad | |
| 9,112,739 B2 | 8/2015 | Farjad-Rad | |
| 2009/0219983 A1* | 9/2009 | Gerfers ........... | H04L 25/0305 375/232 |

\* cited by examiner

*Primary Examiner* — Ross Varndell
(74) *Attorney, Agent, or Firm* — Schwegman Lundberg & Woessner, P.A.

(57) ABSTRACT

A system can be configured to control an equalizer circuit to equalize a data signal without requiring prior knowledge of the data signal's data rate. In an example, the system includes an equalizer circuit configured to equalize a data signal based on an equalizer control signal to produce an equalized signal, and a pattern detector configured to detect a specified data pattern in the equalized signal at each of multiple sampling rates. A control circuit can be configured to generate a preferred equalization control signal based on a sampling rate, selected from the multiple sampling rates, at which the pattern detector detects the specified data pattern in the equalized signal.

20 Claims, 5 Drawing Sheets

| STEP | EQ CIRCUIT CONFIGURATION | SAMPLING FREQUENCY | BIT PATTERN PRESENT | OPTIMAL EQ CIRCUIT CONFIGURATION |
|---|---|---|---|---|
| 1 | EQ(1) | S1 | YES | |
| 2 | EQ(1) | S2 (S2 > S1) | YES | |
| 3 | EQ(1) | S3 (S3 > S2) | YES | X |
| 4 | EQ(1) | S4 (S4 > S3) | NO | |
| | | | | |
| 5 | EQ(2) | S1 | YES | |
| 6 | EQ(2) | S2 (S2 > S1) | YES | X |
| 7 | EQ(2) | S3 (S3 > S2) | NO | |
| (8) | EQ(2) | S4 (S4 > S3) | N/A | |
| | | | | |
| M-3 | EQ(n) | S1 | NO | |
| M-2 | EQ(n) | S2 (S2 > S1) | NO | |
| M-1 | EQ(n) | S3 (S3 > S2) | NO | |
| M | EQ(n) | S4 (S4 > S3) | NO | |

FIG. 7

EQUALIZER CIRCUIT OPTIMIZATION USING COARSE FREQUENCY DETECTION

BACKGROUND

An electrical signal can degrade as it is transmitted via a medium, such as a cable or trace on a circuit board. For example, a signal's frequency spectrum can be changed, such as including attenuation of high-frequency components of the transmitted signal. In a digital signal, narrow signal pulses can exhibit lower peak amplitudes than wide pulses, which can lead to errors in bit recovery. Another result of frequency spectrum degradation is signal "jitter," that is, signal transitions that may not occur at multiples of a fixed time interval. It can be difficult to recover data from a signal that exhibits greater than a threshold amount of jitter.

In an example, a data signal can be equalized or filtered to compensate for frequency degradation, such as to restore various attenuated frequency components of the original signal. In some examples, characteristics of a transmission medium and/or of a transmitted signal itself, such as a frequency or data rate, can vary. For example, a cable length can vary significantly, such as from zero to 100 meters in the case of a 100BASE-TX Ethernet network. Different equalization settings can be thus be used depending on the circumstances of a particular signal or channel. For example, signals transmitted over relatively short cable lengths will generally benefit from different equalization than signals transmitted over longer cable lengths.

An adaptive or adjustable equalizer circuit can be configured to provide different amounts of types of signal equalization or signal processing to an input signal, such as based on instructions from a control circuit. For example, the control circuit can be configured to select different equalizer circuit configurations when the equalizer circuit is used with signals transmitted via short and long cable lengths.

An adjustable equalizer circuit can thus be optimized for use with a particular transmission medium or input signal type.

SUMMARY OF THE DISCLOSURE

The present inventor has recognized, among other things, that a problem to be solved includes selecting a configuration for an equalizer circuit to use to process a data input signal and provide an equalized output signal. In an example, the problem includes selecting an equalizer circuit configuration without prior knowledge of, or information about, a rate or frequency of the data input signal.

In an example, a solution to the above-described problem includes a system for controlling an equalizer circuit to equalize a data signal, such as without requiring prior knowledge of the data signal's data rate. The system can include an equalizer circuit configured to equalize a data signal based on an equalizer control signal to produce an equalized signal. The system can further include a pattern detector configured to detect a specified data pattern in the equalized signal, such as at each of multiple sampling rates. The system can further include a control circuit configured to generate the equalization control signal based on at which rate of the multiple sampling rates that the pattern detector detects the specified data pattern in the equalized signal.

In an example, the pattern detector can be configured to detect the specified data pattern in the equalized signal for individual equalizer circuit configurations corresponding to different equalizer control signals. The specified data pattern can include three or more consecutive bits with signal level transitions between each bit, for example, an "010" bit pattern, or a "101" bit pattern. In an example, the control circuit is configured to determine a sampling rate, from the multiple sampling rates, at which the pattern detector transitions from identifying the specified data pattern in the equalized signal to not identifying the specified data pattern in the equalized signal. The control circuit can be further configured to generate a preferred equalization control signal based on the determined sampling rate. In an example, the control circuit generates the preferred equalization control signal based on a lesser one of the sampling rates at the transition.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

In serial digital data communication, a digital data signal can be sent at high speed over band-limited channels, sometimes referred to as a backplane. Such a backplane can exhibit a low-pass characteristic that attenuates high-frequency information, such as digital signal edge information, or that introduces other errors or anomalies into the transmitted signal. This loss in signal fidelity or integrity can lead to so-called runt pulses (i.e., pulses that do not attain a valid high or low signal level), missing-bits, or discrepancies in edge locations in high-frequency bit patterns (e.g., "1010 . . . ") and lower-frequency bit patterns (e.g., "111000111000 . . . "), among other issues.

Systems and methods described herein can include or use an adjustable equalizer circuit to help mitigate signal losses. In an example, the systems and methods include an adjustable equalizer circuit, an adjustable frequency clock source, and one or more data samplers. The data sampler can be configured to sample an equalized signal from the equalizer circuit, at multiple different sampling rates according to the clock source, and to identify a preferred one of multiple configurations of the adjustable equalizer circuit. The preferred configuration can be one that yields a most open signal "eye", as further explained below. In an example, the systems and methods described herein can be used in digital-to-analog converter circuits, in asynchronous devices or systems such as without full clock and data recovery (CDR) and/or delay-locked loop (DLL) circuits, or in asynchronous cross-point switching devices, among other uses.

In an example, a sampler circuit can be provided at a channel location where digital data is to be identified or recovered. An oscillator or clock can provide a variable frequency signal to the sampler circuit, and the sampler circuit can use the variable frequency signal to open or close a sample window. That is, the sampler circuit can determine whether a signal high, or digital "1", is present in the digital data signal between consecutive clock signal edges.

In an example, a quality of a digital signal can be determined by analyzing its eye pattern or eye diagram. In an eye diagram, a digital signal is repetitively sampled and applied to a vertical input, while a specified data rate is used to trigger a horizontal sweep. The resulting diagram is a synchronized superposition of the signal of interest viewed in a signaling interval. The diagram can be used to visually evaluate performance of a channel transmission system, for example, in the presence of channel noise or intersymbol interference (ISI), among other things. In an example, if signals in an eye diagram are tightly grouped then there is little signal jitter. However, if signal edges occur in multiple places, then there can be a looser grouping and the signal eye is considered partially closed. When the eye is open, then a relatively large percentage of a data bit period does not include an edge transition. In an example, when data is transferred over long channels, or even short channels with low fidelity, then there may not be a discernable eye. In this case, there may not be a suitable place within the signal stream to sample, and errors can occur.

In an example, a corrective circuit can be used to correct or clean up a digital data stream, such as to reconstruct or enhance a quality of a digital signal. For example, an equalizer circuit can be used to receive a poor quality digital signal and, in response, provide a corresponding, higher quality digital signal. In an example, the equalizer circuit can amplify high frequency signal components or attenuate noise in the digital signal to provide a higher quality digital signal.

Figure 1:
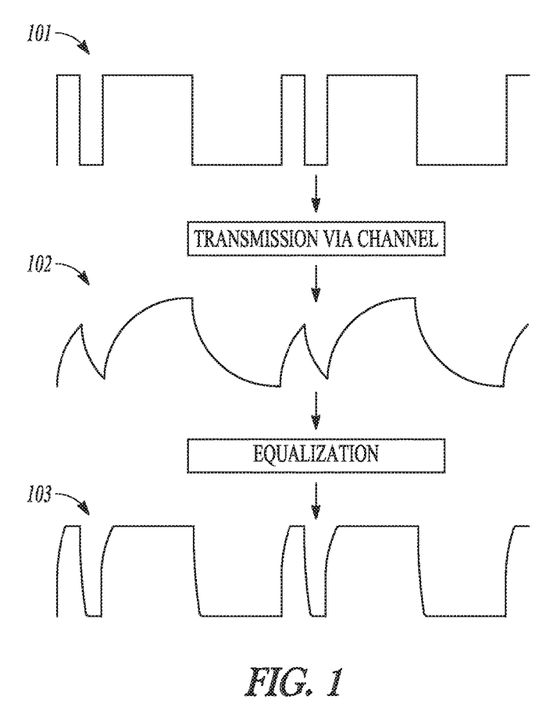
FIG. 1 illustrates generally examples of ideal, degraded, and equalized signals.

FIG. 1 illustrates generally a signal diagram that shows ideal, degraded, and equalized signals. An ideal signal 101 can be communicated or transmitted from a source device via a channel, such as a wired or wireless communication channel. As a result of communicating the ideal signal 101 using the channel, various interference or frequency spectrum changes can be introduced to the signal, and a degraded signal 102 can be provided at an output of the channel, such as at an input of a receiver device. The degraded signal 102 represents a version of the ideal signal 101 with degraded frequency components and other issues such as jitter or ISI. Jitter or ISI can reduce the receiver device's ability to recover meaningful data from the degraded signal 102.

In an example, the ideal signal 101 includes digital information and, because the degraded signal 102 is an imperfect representation of the ideal signal 101, information from the ideal signal can be lost. The degraded signal 102 can optionally be processed using an equalizer circuit to compensate for transmission-related losses or artifacts that result from communicating the ideal signal 101 using the channel. In an example, an equalizer circuit can be used to selectively boost or attenuate different frequency components of the degraded signal 102 to provide an equalized output signal 103 that more closely approximates the ideal signal 101. In an example, the equalized output signal 103 can be processed by other downstream devices, such as a clock and data recovery circuit, an ADC or DAC, or other device.

An equalizer circuit that receives the degraded signal 102 and provides the equalized output signal 103 can be adjusted continuously or at specified intervals, such as to accommodate changes in one or more of the input signal, the transmission channel, or the environment, among other things. Some systems and methods for adapting or updating an equalizer circuit include switching capacitor techniques or digital signal processing techniques. Such techniques generally use digital signal sampling at greater than the Nyquist rate, which can make such techniques difficult to apply in high-speed applications, and can require complicated circuitry with significant power requirements.

An adjustable equalizer circuit can have multiple filters or signal processors with a range of settings, and various settings can be applied to compensate for the changes in the input signal, transmission channel, or environment. The process of identifying and selecting an appropriate setting or configuration can be called tuning, adapting, or adjusting the equalizer circuit.

In an example, an equalizer circuit configuration can be selected using recovered data and an error counter. A preferred configuration can be one that yields an equalized signal having a largest "eye" opening or largest margin for a data sampler to use. In an example, an equalizer circuit configuration can be selected by identifying a specified digital pattern or signal edge information, and using a signal edge location to determine if the signal is under-equalized or over-equalized. Such a technique works best in systems where equalizer circuit configurations are "low to high" equalizer levels, that is, corresponding to a single direction of codes or configurations that provide either "more" or "less" eye opening or improvement. For this technique to operate properly, the input signal's data rate is generally known, such that a clock circuit is already set to a correct frequency, and therefore a data sampler is configured to sample at a correct sampling rate. In other words, there is information about what signal portions correspond to data, and what portions correspond to an edge.

In an example, an equalizer circuit configuration can be selected based on information from first and second sampler circuits. The first and second sampler circuits can sample the same data input signal, and a phase shifter can be configured to move a sampling window of the second sampler to look for signal edges, or edges of a signal eye. Such an eye monitor function can be used to obtain multiple data samples using the first and second samplers and then to compare the samples. Based on a correspondence of the samples from the first and second sampler circuits, an edge of the eye can be identified. An equalizer circuit can be adapted according to this method even when the equalizer circuit configurations are not monotonically adjusted since independent measurements of the eye opening can be relatively compared. An equalizer circuit configuration that yields the biggest eye opening can be selected for use. This and other equalizer circuit adjustment techniques can require or use information about a frequency of the data input signal to lock a sampler circuit to an appropriate sampling frequency. However, on asynchronous cross-point devices and/or repeater/signal conditioner devices, a user may not be expected to program the device to a specified frequency each time a system parameter is updated or reconfigured.

In an example, one or more characteristics of an input signal can be unknown. For instance, the input signal's data rate, frequency, quality, or other characteristic can be unknown in advance of processing. In such a case, an adjustable equalizer circuit can be provided. An adjustable equalizer circuit can provide different amounts of signal change or correction depending on the signal's corresponding channel type, length, amplitude, data rate, or other characteristic of the signal itself or of the system that transmits the signal.

The present inventor has recognized that a problem to be solved includes identifying or determining how to configure an adjustable equalizer circuit to provide an enhanced or improved digital signal. In an example, the problem includes determining which of multiple different parameters of the adjustable equalizer circuit to change to provide the enhanced or improved digital signal. In an example, the problem includes dynamically adjusting an equalizer circuit in response to a change in input signal quality, signal noise, channel type, data rate, or in response to a change in a transmission medium or environment in which a signal travels, among other changes. In an example, the problem includes identifying which of multiple adjustable equalizer circuit configurations provides a most-open signal eye. A configuration that yields an open eye can be successfully used together with a sampler circuit, for example, because a larger eye opening can correspond to more sampler circuit tolerance to signal errors, sampling clock jitter, or other issues. In an example, a further problem to be solved can include selecting an optimal equalizer circuit configuration for processing a data input signal when a frequency or data rate of the data input signal is not known or specified. In an example, the problem includes identifying an appropriate equalizer circuit configuration without using a clock and data recovery (CDR) module to first identify a data or sampling rate.

In an example, the present disclosure includes systems and methods for detecting a specified bit pattern, or digital word, in the equalized output signal 103. The systems and methods can include monitoring the equalized output signal 103 using multiple different equalizer circuit configurations and indicating when the specified bit pattern is identified or is not identified. Information about a transition between successfully identifying the specified bit pattern and unsuccessfully identifying the specified bit pattern can be used to select an appropriate configuration for the equalizer circuit.

Figure 2:
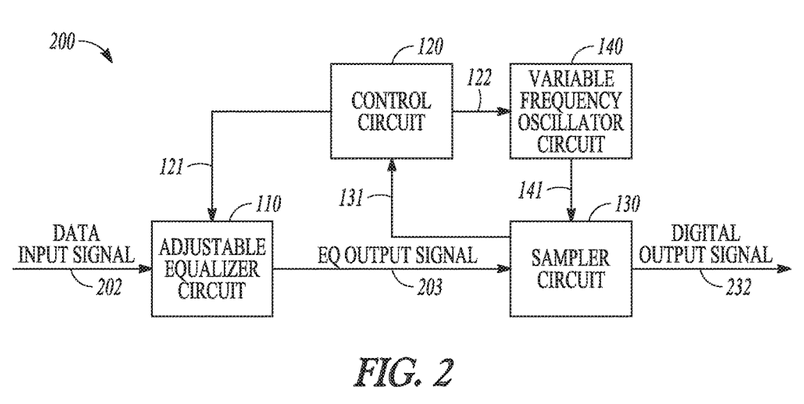
FIG. 2 illustrates generally a block diagram of a system that includes an adjustable equalizer circuit.

FIG. 2 illustrates generally a block diagram of a system 200 that includes an adjustable equalizer circuit 110. In an example, the system 200 can be configured to receive a data input signal 202, select and apply equalization to the data input signal 202 using the adjustable equalizer circuit 110, and provide an equalizer output signal 203 and a digital output signal 232. The equalizer output signal 203 includes a continuous data signal and the digital output signal 232 includes a sampled bit sequence portion of the equalizer output signal 203. The system 200 can include or use a control circuit 120 to configure the system to test multiple different equalizer circuit configurations and identify a preferred one of the configurations for use. In an example, the control circuit 120 can be implemented using a state machine.

The adjustable equalizer circuit 110 can be configured based on an equalizer control signal 121 provided by the control circuit 120. In response to the equalizer control signal 121, one or more characteristics of the adjustable equalizer circuit 110 can be updated or changed, as further explained below.

In an example, the system 200 includes a feedback path that includes a sampler circuit 130, the control circuit 120, and the adjustable equalizer circuit 110. The sampler circuit 130 can be configured to receive the equalizer output signal 203 from the adjustable equalizer circuit 110 and determine whether a specified bit pattern is present in a sampled portion of the equalizer output signal 203. That is, the sampler circuit 130 can include a pattern detector configured to identify a specified bit pattern. The pattern detector can monitor the equalizer output signal 203, such as can include a continuous serial data stream signal, for a specified sequence of signals and identifiers (e.g., digital ones or zeros) to determine whether a specified bit pattern, or series of digital high and low values, is or is not present. In an example, the sampler circuit 130 is configured to identify whether an alternating bit pattern (e.g., "101" or "010") is present in the equalizer output signal 203 when the sampler circuit 130 samples the continuous equalizer output signal 203 at a particular sampling rate. A feedback signal 131 can carry information, such as information about whether the specified bit pattern is identified in the equalizer output signal 203, from the sampler circuit 130 to the control circuit 120.

In an example, the sampler circuit 130 samples the equalizer output signal 203 at a sampling rate dictated by the control circuit 120, and the sampler circuit 130 determines whether the specified bit pattern is present for each of multiple different sampling rates. In an example, the control circuit 120 can provide a frequency control signal 122 to a variable frequency oscillator circuit 140, which in turn can provide a sampling frequency signal 141 to the sampler circuit 130. The sampler circuit 130 can sample the equalizer output signal 203 at a rate that corresponds to the frequency control signal 122, and then the sampler circuit 130 can provide the feedback signal 131 to the control circuit 120 with information about whether a specified bit pattern is identified in a bit sequence sampled from the equalizer output signal 203, such as for a given sampling rate or value of the frequency control signal 122.

In an example, the control circuit 120 includes an equalizer tuner state machine. The state machine can be configured to respond to information from the feedback signal 131 and provide the equalizer control signal 121 and the frequency control signal 122 to change parameters or configurations of one or both of the adjustable equalizer circuit 110 and the variable frequency oscillator circuit 140, respectively. In an example, the state machine is configured to step the adjustable equalizer circuit 110 through multiple configurations, and to step the sampler circuit 130 through multiple different sampling rates, to identify a preferred configuration for the adjustable equalizer circuit 110.

The control circuit 120 and/or the sampler circuit 130 can include or use a processor circuit and memory circuit. The memory circuit can include a massed, machine-readable medium. The processor circuit can be in data communication with the memory circuit, and can be configurable to execute one or more instructions stored by the machine-readable medium. In an example, a massed machine-readable medium comprises a machine readable medium with a plurality of particles having resting mass. Non-limiting machine-readable medium examples include solid-state memories, and optical and magnetic media. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

Figure 3:
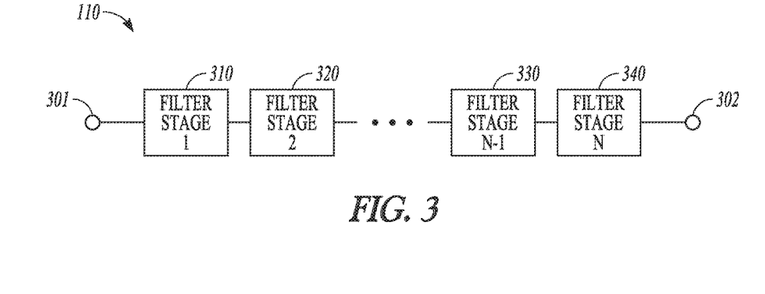
FIG. 3 illustrates generally an example of an adjustable equalizer circuit.

FIG. 3 illustrates generally an example of an adjustable equalizer circuit 110. The adjustable equalizer circuit 110 can be an analog or a digital filter, and can have an adjustable, frequency-dependent amplitude or phase transfer characteristic. Different equalizer circuits, with different ranges of adjustability or tuning can be used. The adjustable equalizer circuit 110 can include multiple filter stages configured to compensate for non-idealities in the data input signal 202, such as can be received at an equalizer input node 301. The multiple filter stages provide the equalizer output signal 203, such as at an equalizer output node 302.

In the example of FIG. 3, the adjustable equalizer circuit 110 includes first through Nth unit stages 310-340, wherein N can be an integer equal to or greater than 1. The first through Nth unit stages 310-340 can be cascaded with one another between the equalizer input node 301 and the equalizer output node 302. Each of the stages can be independently adjustable and can include, among other things, a high-pass filter, a low-pass filter, a band-pass filter, an all-pass filter, or other filter or signal processor. One or more of the filters or processors in the stages 310-340 can change its signal transfer function based on values or characteristics of the equalizer control signal 121 from the control circuit 120.

Each of the stages 310-340 can be similarly or dissimilarly configured. In an example that includes four stages, a first stage 310 can include a programmable gain amplifier (PGA), a second stage 320 can include a high-pass filter (HPF), a third stage 330 can include a low-pass filter, and a fourth stage 340 can include an output amplifier. Any one or more of the stages can be configured to be adjustable, such as in response to the equalizer control signal 121 from the control circuit 120. For example, a roll-off frequency of a low pass filter can be adjusted, a gain characteristic of a PGA can be adjusted, or a notch filter center frequency can be adjusted, among other things.

In an example, a PGA in the first stage 310 can be configured to receive the data input signal 202 as a voltage signal via the equalizer input node 301, and amplify the voltage signal to generate a PGA output signal. A gain of the PGA can be digitally controlled using the equalizer control signal 121 from the control circuit 120. Changing the gain of the PGA can adjust an overall gain of the adjustable equalizer circuit 110 such that the circuit's response can be programmatically increased or decreased in response to various transmitter or channel characteristics.

In an example, a high-pass filter, such as in the second stage 320, can be configured to receive an output signal from the first stage 310 (e.g., a PGA output signal) and then selectively amplify certain frequencies of the PGA output signal to generate a high-pass filtered output signal. In an example, a filter characteristic of the high-pass filter in the second stage 320 can be controlled using the equalizer control signal 121 from the control circuit 120. In an example, an output amplifier in the fourth stage 340 can be configured to amplify a high-pass filtered and/or low-pass filtered signal according to a specified gain characteristic (e.g., from the equalizer control signal 121) to generate or provide the equalizer output signal 203 at the equalizer output node 302. Various other signal processing, filtering, or signal adjustment can be applied to the data input signal 202 by one or more of the stages in the adjustable equalizer circuit 110.

In an example, a filter stage can include two or more unit stages having the same or different characteristics. Each of the unit stages can have a selected frequency range for a signal to pass through the unit stage or to be boosted by the unit stage. In some examples, two or more unit stages can have different frequency ranges and/or responses, or different boost characteristics such as a boost amount and/or boost frequency.

In an example, the adjustable equalizer circuit 110 can be adjusted without requiring prior knowledge of a data rate or other characteristic of the data input signal 202. Information from the sampler circuit 130 can be used to provide coarse frequency detection (CFD) to identify an effect of data jitter, or eye closure, on the performance of asynchronous sampling. In an example, CFD can be performed using the sampler circuit 130 with an adjustable sampling frequency to sample a serial input data signal, such as the equalizer output signal 203, to yield a series of digital samples (i.e., 1's and 0's). The series of digital samples can be used to determine whether the sampler circuit 130 is sampling too quickly or too slowly, and thereby provide an indication of a data rate of data input signal 202.

For example, the sampler circuit 130 can be configured to acquire samples of a continuous time data signal, such as the equalizer output signal 203, at a rate of $F_{CLK}$. The sampler circuit 130 can be configured to move or adjust $F_{CLK}$, such as monotonically (i.e., in an always-increasing or always-decreasing manner). The frequency of the equalizer output signal 203 can have a period (i.e., corresponding to a solitary "1" or "0" bit) of $T_{DATA}$. The signal frequency is thus $F_{DATA}=1/T_{DATA}$. In an example, the sampler circuit 130 can be configured to sample a specified number of samples from the equalizer output signal 203 and then determine whether a specified data pattern is or is not present in the signal, such as at each of multiple different sampling rates $F_{CLK}$.

Figure 4:
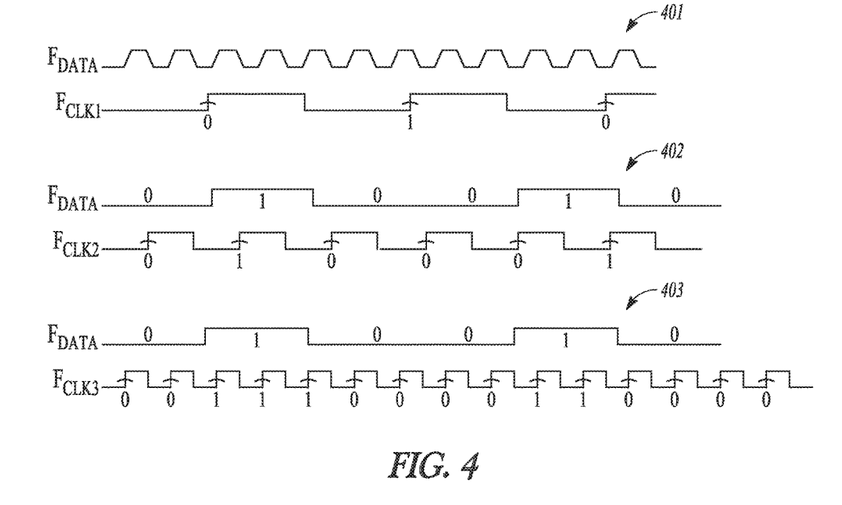
FIG. 4 illustrates generally examples of samples taken of an equalizer output signal at different sampling rates.

FIG. 4 illustrates generally examples of samples taken of the equalizer output signal 203 at different sampling rates. FIG. 4 illustrates a data rate of $F_{DATA}$, and various sampling rates $F_{CLK1}$-$F_{CLK3}$, that can be used together to provide coarse detection of the frequency or rate $F_{DATA}$. For example, at 401, $F_{CLK1} \ll F_{DATA}$, and there can be many signal transitions between consecutive or sequential samples when the sampler circuit 130 samples the equalizer output signal 203 at $F_{CLK1}$. That is, for $F_{CLK1} \ll F_{DATA}$, there can be a high probability that the sampler circuit 130, sampling $F_{DATA}$ at a rate $F_{CLK1}$, will detect a data pattern such as "0101" or "1010". At 402, for $F_{CLK2} \approx F_{DATA}$, there can occasionally be transitions between consecutive samples. That is, for $F_{CLK2} \approx F_{DATA}$, there can be a non-zero probability that a data pattern such as "0101" or "1010" will be detected when the sampler circuit 130 samples $F_{DATA}$ at $F_{CLK2}$. At 403, for $F_{CLK3} \gg F_{DATA}$, there can be zero probability that a data pattern such as "0101" or "1010" will be detected. Instead, at $F_{CLK3}$, the sampler circuit 130 will detect a data pattern such as "000111000" or "111000111". Taking these results together, a true frequency of $F_{DATA}$ can be determined to be between $F_{CLK2}$ and $F_{CLK3}$. Thus by sampling the equalizer output signal 203 at multiple different sampling rates and analyzing the results, such as determining whether or not a specified bit pattern is detected for each sampling rate, $F_{DATA}$ can be approximated.

In an example, such a coarse frequency detecting technique can be applied as a starting point in determining a data signal frequency, for example, because there may be no issues with harmonics. That is, coarse frequency detection can be used to detect whether a sampling rate ($F_{CLK}$) is too slow regardless of how slowly samples are acquired. For example, if $F_{CLK}$=100 MHz (100 Mb/s) and $F_{DATA}$=10 GHz (10 Gb/s), then the pattern detector can nonetheless identify patterns such as "0101" or "1010" in samples of the equalizer output signal 203. Indeed, the slower $F_{CLK}$ is compared to $F_{DATA}$, the coarse frequency detection will indicate that a sampling rate is too slow with more information per second. When $F_{CLK}$ is increased and approaches $F_{DATA}$, the likelihood decreases that random samples include a segment with sequential bit transitions (e.g., a "1010" or "0101" pattern), and when $F_{CLK}$ is greater than $F_{DATA}$, then the likelihood of finding such a pattern of sequential bit transitions is zero. In other words, in a method of frequency detection that looks for two signal transitions in one sample-clock period, such an occurrence will not occur when $F_{CLK} > F_{DATA}$ because a minimum time between transitions is $T_{DATA}$, and when $F_{CLK} > F_{DATA}$, two samples are taken every $T_{CLK}$, and $T_{CLK} < T_{DATA}$.

In an example, as a signal eye closes due to ISI, duty cycle distortion, periodic or random jitter, or other signal issue, coarse frequency detection can indicate that $F_{CLK}$ is slow even when $F_{CLK} = F_{DATA}$ (or $F_{CLK} = F_{DATA} + F_{SMALL}$). The more closed the eye is, the higher in frequency that $F_{CLK}$ needs to be before the coarse frequency detection indicates that $F_{CLK}$ is too fast.

Figure 5:
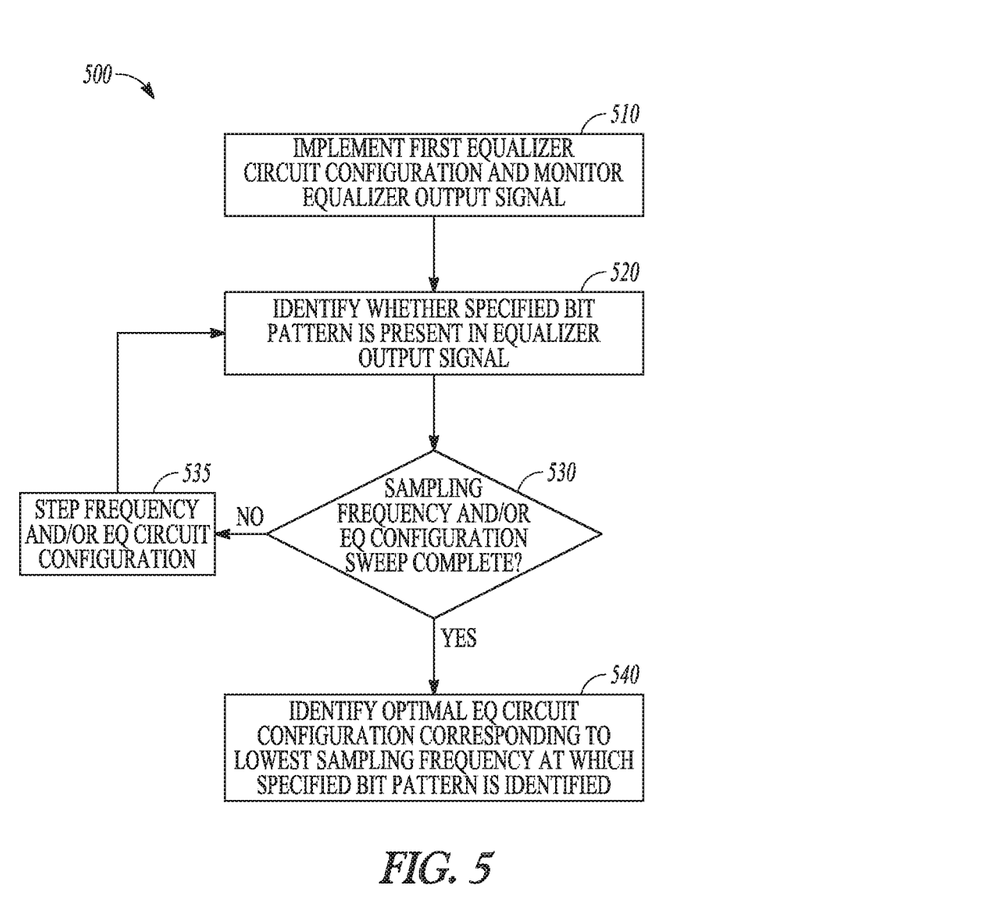
FIG. 5 illustrates generally an example of a process that includes identifying an optimal configuration for an equalizer circuit.

FIG. 5 illustrates generally an example of a process 500 that includes identifying an optimal configuration for an equalizer circuit. At operation 510, the example includes implementing a first equalizer circuit configuration and monitoring an equalized digital output signal. Operation 510 can include receiving configuration information or instructions at the adjustable equalizer circuit 110 from the control circuit 120 (e.g., using the equalizer control signal 121), and implementing the configuration information at the adjustable equalizer circuit 110 by updating or adjusting one or more signal processing or signal filter characteristics, such as corresponding to one or more of N equalizer filter stages (see the example of FIG. 3). In an example, operation 510 includes using the sampler circuit 130 to monitor or sample the equalizer output signal 203.

At operation 520, the example includes identifying whether a specified bit pattern is present in a sampled portion of the equalizer output signal 203. Operation 520 can include using the sampler circuit 130 to acquire two or more consecutive samples at a sampling rate $F_{CLK}$. The sampling rate $F_{CLK}$ can be selected by the control circuit 120 or oscillator circuit 140. The operation 520 can include storing information (e.g., in a memory circuit) about a present sampling rate, equalizer circuit configuration, and whether the bit pattern is identified at the present sampling rate and equalizer circuit configuration.

The process 500 can include changing the sampling rate $F_{CLK}$ and changing a configuration of the adjustable equalizer circuit 110. Each change to the configuration of the adjustable equalizer circuit 110 can yield a differently filtered or processed equalizer output signal 203. For a given sampling rate $F_{CLK}$, the process can include identifying whether the specified bit pattern is present in the equalizer output signal 203 for each of multiple different equalizer circuit configurations.

For example, at a first sampling rate $F_1$, the control circuit 120 can provide one or more control signals to the adjustable equalizer circuit 110 to cycle or sweep the adjustable equalizer circuit 110 through two or more different configurations. The control circuit 120 can be further configured to provide one or more control signals to the sampler circuit 130 to sample the equalizer output signal 203 when the adjustable equalizer circuit 110 is configured according to each different configuration. The control circuit 120 can repeat the same series of control signals, such as to configure the adjustable equalizer circuit 110 according to each of the same multiple different configurations, when the sampler circuit 130 is configured to sample the equalizer output signal 203 at a second sampling rate $F_2$.

In the example of FIG. 5, at operation 530, the example can include determining whether a sweep of equalizer circuit configurations is complete, and/or can include determining whether a sweep of sampling rates is complete. Whether the sweep is complete can be determined by the control circuit 120, by an available number of different configurations of the adjustable equalizer circuit 110, or by a number of different sampling rates $F_{CLK}$ to be used.

If, at operation 530, a sweep of equalizer circuit configurations is not complete and/or a sweep of sampling rates is not complete, then at operation 535 the process 500 includes stepping or changing an equalizer circuit configuration and/or sampling rate. For each step or change in equalizer circuit configuration and/or sampling rate, the process 500 includes returning to operation 520 to identify whether the specified bit pattern is present in the equalizer output signal 203, and then to operation 530 to determine whether the configuration and rate sweeps are completed.

At operation 535, stepping or changing the sampling frequency can include controlling a programmable clock source, such as the variable frequency oscillator circuit 140, or controlling an LC tank with programmable capacitor array, or other means by which an oscillation frequency of a signal can be changed in a known manner. In an example, operation 535 can be performed multiple times for increasing sampling rates, such as until a bit pattern is no longer recognized in the equalizer output signal 203. In an example, operation 535 includes controlling a programmable capacitor array in an LC tank, including reducing a capacitance on the LC tank until $F_{CLK}$ is sufficiently high such that the specified bit pattern is not recognized by the sampler circuit 130.

If, at operation 530, a sweep of equalizer circuit configurations is complete and a sweep of sampling rates is complete, then at operation 540 the process 500 can include identifying an optimal or preferred equalizer circuit configuration. In an example, the specified bit pattern can be identified at operation 520 for multiple different equalizer circuit configurations or for multiple different sampling rates. A preferred equalizer circuit configuration can correspond to one at which the bit pattern is identified and the sampling rate is the least.

The example process 500 can be summarized as follows. First, an initial equalizer circuit configuration can be selected and applied by the adjustable equalizer circuit 110. Second, coarse frequency detection can be performed, such as by using the sampler circuit 130 to determine whether a specified bit pattern, comprising at least two sequential bit transitions, is identified in an output signal from the adjustable equalizer circuit 110 for the given initial equalizer circuit configuration and multiple different sampling frequencies. Third, a "best guess" is made (e.g., using the control circuit 120 and/or sampler circuit 130) about the data rate for the output signal from the adjustable equalizer circuit 110. The best guess can be based on a transition between successfully identifying the specified bit pattern at a first sampling frequency, and not identifying the specified bit pattern at a greater second sampling frequency. Fourth, the first through third steps can be repeated for each of multiple different equalizer circuit configurations. Finally, the "best guesses" for each different equalizer circuit configuration can be compared. The best guess that corresponds to a least sampling frequency can thus correspond to a "best" configuration for the adjustable equalizer circuit 110.

Various techniques for identifying the preferred equalizer circuit configuration can be used. A table-based approach is further discussed and illustrated below in the examples of FIGS. 6 and 7.

Figure 6:
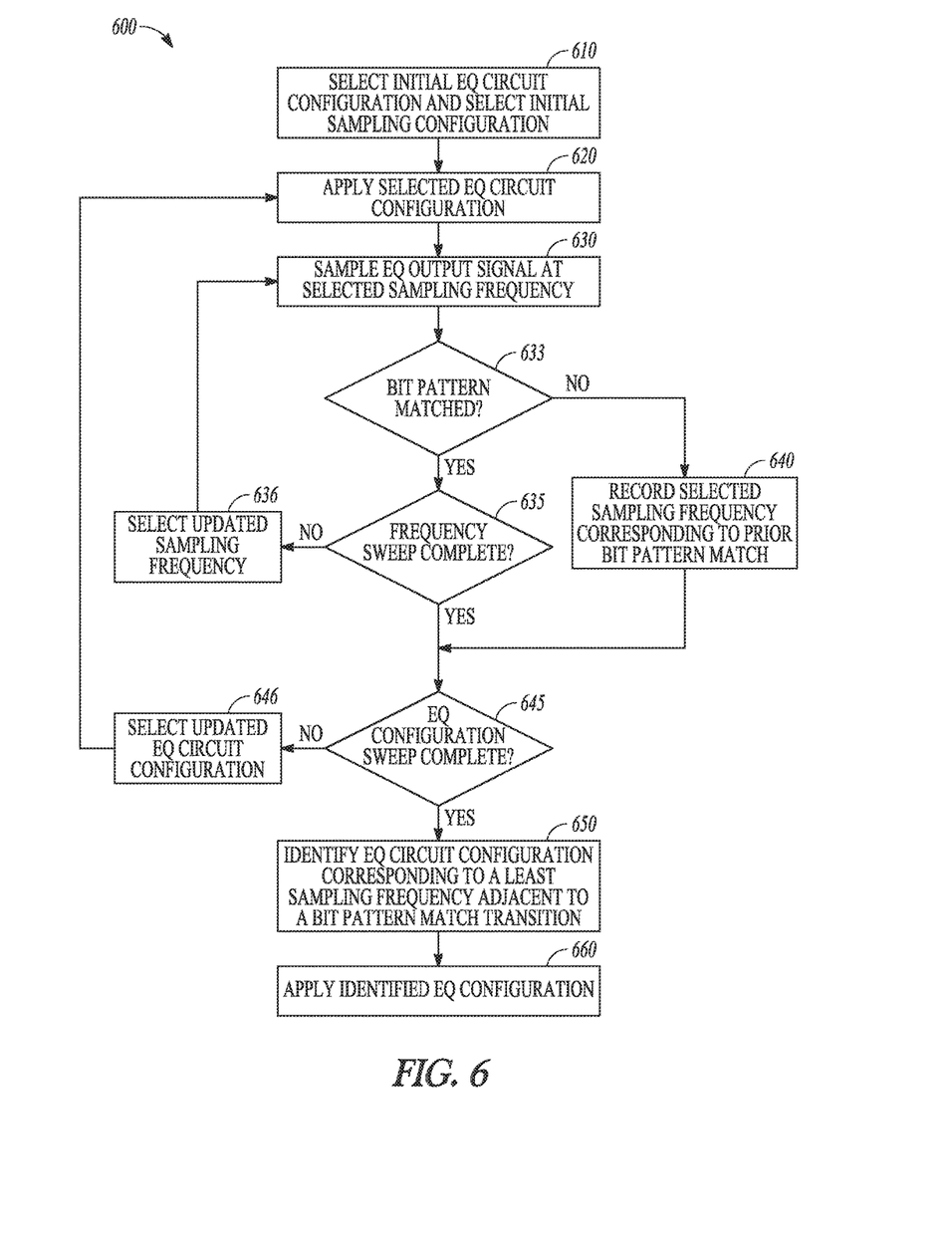
FIG. 6 illustrates generally an example of a process that includes identifying an optimal configuration for an equalizer circuit.

FIG. 6 illustrates generally an example of a process 600 that includes identifying an optimal configuration for an equalizer circuit. The process 600 includes a sweep of multiple equalizer circuit configurations and a sweep of multiple sampling frequencies. In the example of FIG. 6, the sampling frequency sweep is nested inside of the equalizer circuit configuration sweep. That is, for a given equalizer circuit configuration, multiple different sampling frequencies are used or tested, and then the equalizer circuit configuration is changed and the multiple different sampling frequencies are used or tested again. In other examples, an equalizer circuit configuration sweep can be nested inside of a sampling frequency sweep.

Figure 7:
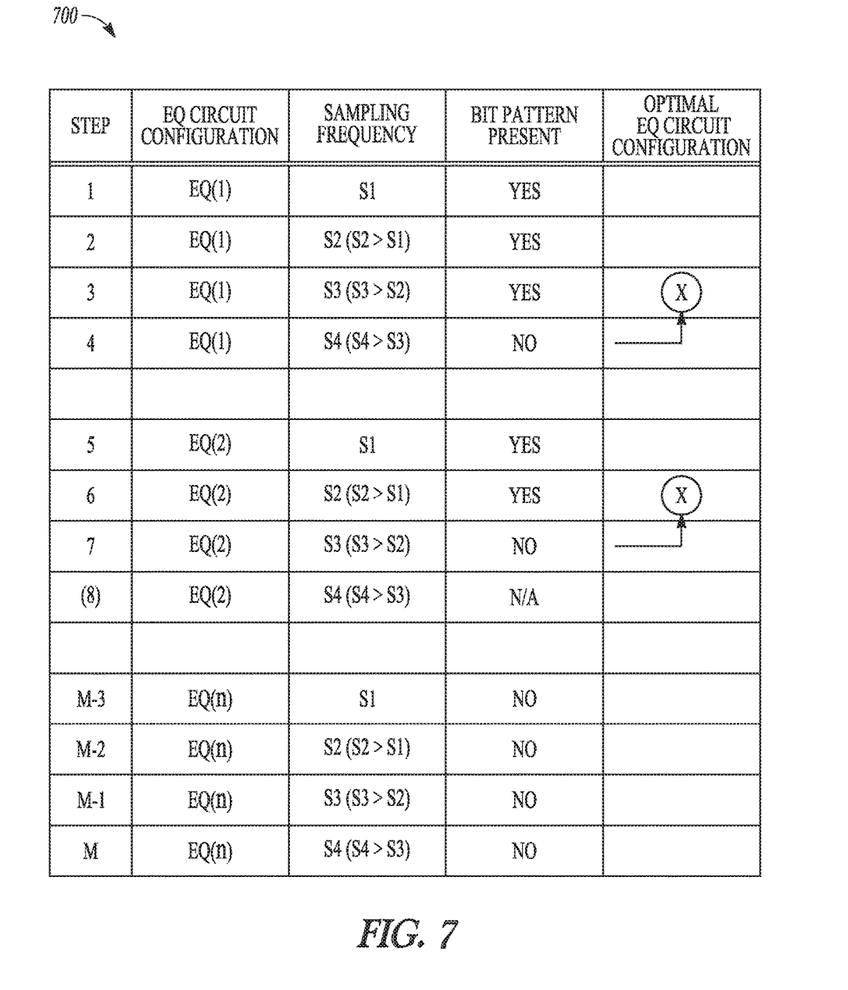
FIG. 7 illustrates generally an example of a table populated according to the example of FIG. 6.

FIG. 7 illustrates generally a table 700 that can be populated as the process 600 of FIG. 6 is performed. In an example, the table 700 represents different memory circuit entries, such as can be included or used in the system 200.

At operation 610, the example includes selecting a first equalizer circuit configuration (e.g., equalizer circuit configuration EQ(1) in the table 700) corresponding to a first configuration of one or more signal processing or filter stages in the adjustable equalizer circuit 110. Operation 610 further includes selecting a first sampling frequency (e.g., sampling frequency S1 in the table 700) for use by the sampler circuit 130. The selecting the configuration and frequency at operation 610 can be performed by the control circuit 120 or by another controller in communication with the system 200.

At operation 620, the selected equalizer circuit configuration can be applied by the adjustable equalizer circuit 110. In an example that includes the first equalizer circuit configuration EQ(1), the data input signal 202 can be processed by the adjustable equalizer circuit 110 to yield the equalizer output signal 203, wherein the signal is processed according to the equalizer settings corresponding to EQ(1).

At operation 630, the process 600 includes sampling the equalizer output signal 203 using the sampler circuit 130, such as at the first sampling frequency S1, to acquire a first sample. At operation 633, the sampler circuit 130 and/or the control circuit 120 can determine whether the first sample includes a specified bit pattern. In an example, the specified bit pattern includes two or more consecutive bit transitions. In other words, the specified bit pattern includes at least a "010" or a "101" bit pattern, but does not include, for example, a "001" or a "110" pattern. In an example, the specified bit pattern includes a four-bit digital word (e.g., "0101"), and can optionally include a longer digital word. In an example, the sampler circuit 130 examines the first sample's bit sequence for bit transitions using exclusive-OR gates among the bits. For example, a five-bit digital word can be examined for at least three transitions using exclusive-OR gates on the sample's bit series.

If the specified bit pattern is identified at operation 633, then the process 600 continues at operation 635 by determining whether a specified number of different sampling frequencies have been used in the process 600. In other words, the operation 635 includes a check to determine if a sampling frequency sweep is completed. If the sampling frequency sweep is not completed, then the sampling frequency can be updated (e.g., from S1 to S2), and the process 600 can return to operation 630 to re-sample the equalizer output signal 203 at the updated sampling frequency. Referring to the example of FIG. 7, data rows 1 through 3 (corresponding to Steps 1-3) of the table can be carried out and the table values can be populated according to the process described at operations 610-636. In the example of FIG. 7, the sampling frequency updates at 636 are monotonically increasing, e.g., from a least sampling rate of S1, to a greater sampling rate S2, and to a further greater sampling rate S3. In other examples, the sampling frequency updates can be monotonically decreasing, or can be performed in a different order.

Referring again to operation 633, if the specified bit pattern is not identified for a given equalizer circuit configuration and sampling frequency, then the process 600 continues at operation 640. If the bit pattern is not identified at operation 633, then, in this example, the sampling frequency is higher than the data rate of the data input signal 202 and of the equalizer output signal 203. At operation 640, the process 600 includes recording information about the preceding sampling frequency that corresponds to a bit pattern match at operation 633. With reference to FIG. 7, operation 640 corresponds to identifying a sampling frequency and corresponding equalizer circuit configuration based on a transition from successfully identifying the bit pattern in Step 3 to not identifying the bit pattern in Step 4. The table 700 includes a notation in the right-most column that, after recognizing the transition from successfully identifying the bit pattern at sampling frequency S3 to not identifying the bit pattern at S4, the lowest frequency at which the bit pattern is determined to be present for the first equalizer circuit configuration EQ(1) is the sampling frequency S3.

The process 600 continues from operation 640, or from determining that the frequency sweep is completed at operation 635, to operation 645. The operation 645 includes determining whether the equalizer circuit configuration sweep is completed. Referring to the example of FIG. 7, there are n different equalizer circuit configurations available. Accordingly, at operation 645, when the sampling frequency sweep is completed for the first equalizer circuit configuration EQ(1), the process 600 continues by selecting an updated equalizer circuit configuration, such as a second equalizer circuit configuration EQ(2), at operation 646. Following selection of the updated equalizer circuit configuration at operation 646, the process 600 continues by returning to operation 620 to apply the updated equalizer circuit configuration (e.g., EQ(2)) and to carry out the remainder of the process 600.

Referring to FIG. 7, Steps 1-8 can be performed according to operations 610-646 of FIG. 6. In the example of FIG. 7, when the equalizer circuit is configured according to the second equalizer circuit configuration EQ(2), the lowest frequency at which the bit pattern is determined to be present for the second equalizer circuit configuration EQ(2) is the sampling frequency S2.

At Steps M-3 through M, the nth equalizer circuit configuration EQ(n) can be applied by the equalizer circuit 110. Using this configuration, the bit pattern is not identified at any one of the sampling frequencies tested. Accordingly the nth equalizer circuit configuration can be discarded.

At operation 650, the process 600 can include identifying a preferred or optimized equalizer circuit configuration for use by the adjustable equalizer circuit 110 to process the data input signal 202. Operation 650 can include identifying an equalizer circuit configuration corresponding to a least sampling frequency that is adjacent to a bit pattern match transition. In an example, the control circuit 120 or sampler circuit 130 can use the table 700 to identify bit pattern match transitions. In the example of FIG. 7, bit pattern match transitions occur for EQ(1) between steps 3 and 4, and for EQ(2) between steps 6 and 7. The control circuit 120 or sampler circuit 130 can then identify a least sampling frequency corresponding to the transitions. For the first equalizer circuit configuration EQ(1), a least sampling frequency corresponding to a bit pattern match transition is S3. For the second equalizer circuit configuration EQ(2), a least sampling frequency corresponding to a bit pattern match transition is S2. At operation 650, an equalizer circuit configuration corresponding to a least one of the identified sampling frequencies can be selected. In the example of FIG. 7, S2 is less than S3, and accordingly the equalizer circuit configuration EQ(2) can be identified as a "best" configuration. At operation 660, the identified equalizer circuit configuration (e.g., EQ(2)) can be applied by the adjustable equalizer circuit 110 to process any subsequently-received information via the data input signal 202.

Thus the adjustable equalizer circuit 110 can be adjusted or adapted to a preferred or optimal setting without requiring information about a data rate of the data input signal 202. In other words, a sampling frequency of the sampler circuit 130 need not be locked to the same frequency of the data input signal 202 to configure the adjustable equalizer circuit 110 to process the incoming signal optimally. Although the examples of FIGS. 6 and 7 illustrate a process that includes monotonically increasing the sampling rate for each consecutive Step or test iteration, a similar process could be performed by monotonically decreasing the sampling rate. In an example, a different or non-linear test order can be used as long as the resulting table or collection of data can be analyzed together to identify an equalizer configuration that corresponds to a least sampling frequency adjacent to a bit pattern match transition.

In an example, information about an expected sampling frequency can be used by the control circuit 120 or the sampler circuit 130 to identify the sampling frequencies or a range of frequencies to test. For example, if an expected sampling frequency is about 100 kHz, then the control circuit 120 can configure the sampler circuit 130 to sample at multiple different rates near 100 kHz (e.g., 99 kHz, 100 kHz, 101 kHz, etc.). In an example, the example of FIG. 6 can be performed by a stand-alone circuit or module, such as in the background or in parallel with some other signal processing or functions. The stand-alone circuit can update an equalizer circuit to a different configuration if it determines that a different equalizer circuit configuration yields a more open eye.

In an example, the systems and methods discussed herein can be used to process or augment an incoming data signal, such as in a serial-in/serial-out cross-point switch, wherein an input signal can be improved by various equalization or filtering, and then the improved signal can be output as a serial data stream. In an example, the systems and methods can be used to tune various settings of an equalizer circuit that provides the equalization or filtering in a serial receiver/transmitter device. In an example, other devices configured to receive serial data signals can include an adjustable equalizer circuit, according to the systems and methods herein, provided in a signal path ahead of one or more sampler circuits configured to receive and sample various digital words or to perform other deserialization for processing. In an example, the systems and methods can be used with various equalizers in a receiver, such as can include or use a feed-forward equalizer (FFE) circuit, a continuous-time linear equalizer (CTLE) circuit, or a decision feedback equalizer (DFE) circuit, such as to tune all or part of an equalizer circuit or to assist in an initialization or signal-lock process of a receiver.

Various Notes & Aspects

Aspect 1 can include or use subject matter such as a system for controlling an equalizer circuit to equalize a data signal without requiring prior knowledge of the data signal's data rate. Aspect 1 can include an equalizer circuit (e.g., the adjustable equalizer circuit 110) configured to equalize a data signal based on an equalizer control signal to produce an equalized signal, and a pattern detector (e.g., the sampler circuit 130) configured to detect a specified data pattern in the equalized signal at each of multiple sampling rates. In an example, the specified data pattern includes a digital word or sequence of bits. Aspect 1 can further include a control circuit (e.g., the control circuit 130) configured to generate an equalization control signal. In an example, the control circuit generates a preferred equalization control signal based on a sampling rate, selected from the multiple sampling rates, at which the pattern detector detects the specified data pattern in the equalized signal. In an example, the control circuit generates the preferred equalization control signal based on results of a coarse frequency detection process, such as described above in the examples of FIGS. 5-7.

Aspect 2 can include or use, or can optionally be combined with the subject matter of Aspect 1, to optionally include the pattern detector is configured to detect the specified data pattern in the equalized signal for individual equalizer circuit configurations corresponding to different equalizer control signals, wherein the control circuit is configured to determine a first sampling rate, from the multiple sampling rates, at which the pattern detector transitions from identifying the specified data pattern in the equalized signal to not identifying the specified data pattern in the equalized signal, and wherein the control circuit is configured to generate a preferred equalization control signal based on the determined first sampling rate.

Aspect 3 can include or use, or can optionally be combined with the subject matter of Aspect 2, to optionally include the control circuit configured to generate the preferred equalization control signal based on a lesser one of the sampling rates at the transition.

Aspect 4 can include or use, or can optionally be combined with the subject matter of Aspect 2, to optionally include the control circuit configuring the pattern detector to sample the equalized signal at multiple, monotonically increasing sampling rates, such as for each of the equalizer circuit configurations.

Aspect 5 can include or use, or can optionally be combined with the subject matter of Aspect 1, to optionally include the pattern detector is configured to detect the specified data pattern in the equalized signal for individual equalizer circuit configurations corresponding to different equalizer control signals, wherein the control circuit is configured to determine a second sampling rate, from the multiple sampling rates, at which the pattern detector transitions from not identifying the specified data pattern in the equalized signal to identifying the specified data pattern in the equalized signal, and wherein the control circuit is configured to generate a preferred equalization control signal based on the determined second sampling rate.

Aspect 6 can include or use, or can optionally be combined with the subject matter of Aspect 5, to optionally include the control circuit configured to generate the preferred equalization control signal based on a lesser one of the sampling rates at the transition.

Aspect 7 can include or use, or can optionally be combined with the subject matter of Aspect 5, to optionally include the control circuit configuring the pattern detector to sample the equalized signal at multiple, monotonically decreasing sampling rates for each of the equalizer circuit configurations.

Aspect 8 can include or use, or can optionally be combined with the subject matter of one or any combination of Aspects 1-7 to optionally include or use the pattern detector configured to detect at least two sequential data bit transitions within a sample-clock period as the specified data pattern in the equalized signal.

Aspect 9 can include or use, or can optionally be combined with the subject matter of one or any combination of Aspects 1-8 to optionally include or use the control circuit configured to carry out a coarse frequency detection process by providing multiple equalizer control signals to the equalizer circuit and using the pattern detector to detect the specified data pattern at each of the multiple sampling rates for each of the multiple equalizer control signals, and wherein the control circuit is configured to generate a preferred equalization control signal based on a result of the coarse frequency detection process.

Aspect 10 can include or use, or can optionally be combined with the subject matter of one or any combination of Aspects 1-9 to optionally include a variable frequency oscillator circuit configured to provide an oscillating signal, responsive to an instruction from the control circuit, to the pattern detector to update the pattern detector's sampling rate.

Aspect 11 can include or use, or can optionally be combined with the subject matter of one or any combination of Aspects 1-10 to optionally include the equalizer circuit is an analog equalizer circuit configured to selectively boost or attenuate one or more frequency components of the data signal.

Aspect 12 can include or use, or can optionally be combined with the subject matter of one or any combination of Aspects 1-11 to optionally include the control circuit is configured to change the equalization control signal when the pattern detector detects a transition from identifying the specified data pattern in the equalized signal at a first sampling rate to not identifying the specified data pattern in the equalized signal at a second sampling rate, or vice versa.

Aspect 13 can include or use, or can optionally be combined with the subject matter of one or any combination of Aspects 1-12 to optionally include a memory circuit that is configured to store data about whether the pattern detector detects the specified data pattern for multiple different equalizer circuit configurations and at at least two of the multiple sampling rates for each equalizer circuit configuration.

Aspect 14 can include, or can optionally be combined with the subject matter of one or any combination of Aspects 1-13 to include or use, subject matter such as a method, or a machine readable medium including instructions that, when performed by a machine or processor circuit, can cause the machine or processor circuit to perform acts, such as can include or use a method for selecting a configuration for an equalizer circuit to process a data signal, without requiring prior knowledge of the data signal's data rate, to provide an equalized digital signal. Aspect 14 can include equalizing a data signal using an equalizer circuit (e.g., the adjustable equalizer circuit 110), the equalizer circuit configured based on an equalizer control signal from a control circuit (e.g., the control circuit 120), and the equalizing producing an equalized signal. Aspect 14 can include detecting, using a pattern detector (e.g., the sampler circuit 130), a specified data pattern in the equalized signal at each of multiple sampling rates. Aspect 14 can further include generating an equalization control signal, using the control circuit, based on at which rate of the multiple sampling rates that the pattern detector detects the specified data pattern in the equalized signal.

Aspect 15 can include or use, or can optionally be combined with the subject matter of Aspect 14, to optionally include the detecting includes detecting the specified data pattern in the equalized signal at individual ones of the multiple sampling rates for multiple equalizer circuit configurations.

Aspect 16 can include or use, or can optionally be combined with the subject matter of Aspect 15, to optionally include the equalizing the data signal includes providing the equalized signal using the multiple equalizer circuit configurations, and the detecting includes, for individual ones of the multiple equalizer circuit configurations, monotonically increasing or decreasing the sampling rate and determining whether the specified data pattern is detected at each sampling rate.

Aspect 17 can include or use, or can optionally be combined with the subject matter of Aspect 16, to optionally include identifying a sampling rate transition wherein the determining whether the specified data pattern is detected transitions from identifying the specified data pattern in the equalized signal at a first sampling rate to not identifying the specified data pattern in the equalized signal at a second sampling rate, or vice versa, and wherein the generating the equalization control signal includes generating a preferred equalization control signal based on the identified sampling rate transition.

Aspect 18 can include or use, or can optionally be combined with the subject matter of Aspect 17, to optionally include the generating the preferred equalization control signal includes selecting an equalizer circuit configuration that corresponds to a lesser one of the first and second sampling rates.

Aspect 19 can include or use, or can optionally be combined with the subject matter of one or any combination of Aspects 14-18 to optionally include or use the equalizing the data signal using the equalizer circuit includes selectively boosting or attenuating one or more frequency components of the data signal, and the data signal comprises an analog representation of a digital signal.

Aspect 20 can include, or can optionally be combined with the subject matter of one or any combination of Aspects 1-19 to include or use, subject matter such as a system for controlling an analog equalizer circuit to equalize a data signal without requiring prior knowledge of the data signal's data rate. Aspect 20 can include or use an equalizer circuit (e.g., the adjustable equalizer circuit 110) having multiple discrete equalizer circuit configurations, the equalizer circuit configured to equalize a data signal according to an equalizer control signal that indicates a specified one of the configurations to produce an equalized signal. Aspect 20 can include or use a pattern detector (e.g., the sampler circuit 130) configured to detect a specified digital data pattern in the equalized signal at each of multiple sampling rates, the specified digital data pattern including at least two signal transitions within a particular sample-clock period. Aspect 20 can further include a control circuit (e.g., the control circuit 120) configured to generate the equalization control signal to cycle the equalizer circuit through two or more of the multiple discrete equalizer circuit configurations at each of the multiple sampling rates, and the control circuit configured to identify a preferred equalization control signal based on a lesser one of the multiple sampling rates at which the pattern detector successfully detects the specified data pattern in the equalized signal.

Each of these non-limiting aspects can stand on its own, or can be combined in various permutations or combinations with one or more of the other aspects or examples discussed herein.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for controlling an equalizer circuit to equalize a data signal without requiring prior knowledge of a data rate of the data signal, the system comprising:
   an equalizer circuit configured to equalize a data signal based on an equalization control signal to produce an equalized signal;
   a control circuit configured to provide multiple equalization control signals to the equalizer circuit; and
   a pattern detector configured to detect a specified data pattern in the equalized signal at each of multiple sampling rates for each of the multiple equalization control signals;
   wherein the control circuit is configured to carry out a coarse frequency detection process using the pattern detector to detect the specified data pattern at each of the multiple sampling rates, and wherein the control circuit is configured to identify a preferred equalization control signal based on a sampling rate, selected from the multiple sampling rates; at which the pattern detector detects the specified data pattern in the equalized signal.

2. The system of claim 1, wherein the pattern detector is configured to detect the specified data pattern in the equalized signal for individual equalizer circuit configurations corresponding to different equalization control signals,
   wherein the control circuit is configured to determine a first sampling rate, from the multiple sampling rates, at which the pattern detector transitions from identifying the specified data pattern in the equalized signal to not identifying the specified data pattern in the equalized signal, and;
   wherein the control circuit is configured to identify the preferred equalization control signal based on the determined first sampling rate.

3. The system of claim 2, wherein the control circuit is configured to identify the preferred equalization control signal based on a lesser one of the sampling rates at the transition.

4. The system of claim 2, wherein for each of the equalizer circuit configurations, the control circuit configures the pattern detector to sample the equalized signal at multiple, monotonically increasing sampling rates.

5. The system of claim 1, wherein the pattern detector is configured to detect the specified data pattern in the equalized signal for equalizer circuit configurations corresponding to different equalization control signals;
 wherein the control circuit is configured to determine a first sampling rate, from the multiple sampling rates, at which the pattern detector transitions from not identifying the specified data pattern in the equalized signal to identifying the specified data pattern in the equalized signal, and;
 wherein the control circuit is configured to generate a preferred equalization control signal based on the determined first sampling rate.

6. The system of claim 5, wherein the control circuit is configured to identify the preferred equalization control signal based on a lesser one of the sampling rates at the transition.

7. The system of claim 5, wherein for each of the equalizer circuit configurations, the control circuit configures the pattern detector to sample the equalized signal at multiple, monotonically decreasing sampling rates.

8. The system of claim 1, wherein the pattern detector is configured to detect at leak two sequential data bit transitions within a sample-clock period as the specified data pattern in the equalized signal.

9. The system of claim 1, further comprising a variable frequency oscillator circuit configured to provide an oscillating signal, responsive to an instruction from the control circuit, to the pattern detector to update the pattern detector's sampling rate.

10. The system of claim 1, wherein the equalizer circuit is an analog equalizer circuit configured to selectively boost or attenuate one or more frequency components of the data signal.

11. The system of claim 1, wherein the control circuit is configured to change the equalization control signal when the pattern detector detects a transition from identifying the specified data pattern in the equalized signal at a first sampling rate to not identifying the specified data pattern in the equalized signal at a second sampling rate, or vice versa.

12. The system of claim 1, further comprising a memory circuit that is configured to store data about whether the pattern detector detects the specified data pattern for multiple different equalizer circuit configurations and for at least two of the multiple sampling rates for each equalizer circuit configuration.

13. A method for selecting a configuration for an equalizer circuit to process a data signal, without requiring prior knowledge of a data rate of the data signal, to provide an equalized digital signal, the method comprising:
 equalizing a data signal using an equalizer circuit, the equalizer circuit configured based on an equalization control signal from a control circuit, and the equalizing producing an equalized signal;
 detecting, using a pattern detector, a specified data pattern in the equalized signal at each of multiple sampling rates for multiple equalizer circuit configurations; and
 generating the equalization control signal, using the control circuit, based on a sampling rate, selected from the multiple sampling rates, at which the pattern detector detects the specified data pattern in the equalized signal;
 wherein the equalizing the data signal includes providing the equalized signal using the multiple equalizer circuit configurations, and wherein the detecting includes, for individual ones of the multiple equalizer circuit configurations, monotonically increasing or decreasing the sampling rate and determining whether the specified data pattern is detected at each sampling rate.

14. The method of claim 13, further comprising:
 identifying a sampling rate transition wherein the determining whether the specified data pattern is detected transitions from identifying the specified data pattern in the equalized signal at a first sampling rate to not identifying the specified data pattern in the equalized signal at a second sampling rate, or vice versa; and
 wherein the generating the equalization control signal includes generating a preferred equalization control signal based on the identified sampling rate transition.

15. The method of claim 14, wherein the generating the preferred equalization control signal includes selecting an equalizer circuit configuration that corresponds to a lesser one of the first and second sampling rates.

16. The method of claim 13, wherein the equalizing the data signal using the equalizer circuit includes selectively boosting or attenuating one or more frequency components of the data signal, and the data signal comprises an analog representation of a digital signal.

17. A system for controlling an analog equalizer circuit to equalize a data signal without requiring prior knowledge of a data rate of the data signal; the system comprising:
 an equalizer circuit having multiple discrete equalizer circuit configurations, the equalizer circuit configured to equalize a data signal according to an equalizer control signal that indicates a specified one of the configurations to produce an equalized signal;
 a pattern detector configured to detect a specified digital data pattern in the equalized signal at each of multiple sampling rates, the specified digital data pattern including at least two signal transitions within a particular sample-clock period; and
 a control circuit configured to generate the equalizer control signal to cycle the equalizer circuit through two or more of the multiple discrete equalizer circuit configurations at each of the multiple sampling rates, and the control circuit configured to identify a preferred equalization control signal based on a lesser one of the multiple sampling rates at which the pattern detector successfully detects the specified data pattern in the equalized signal.

18. The system of claim 17, wherein the control circuit is configured to generate the equalizer control signal to cycle the equalizer circuit through two or more of the multiple discrete equalizer circuit configurations at multiple monotonically increasing sample rates.

19. The system of claim 17, wherein the control circuit is configured to generate the equalizer control signal to cycle the equalizer circuit through two or more of the multiple discrete equalizer circuit configurations at multiple monotonically decreasing sample rates.

20. The system of claim 17, wherein the equalizer circuit is configured to selectively boost or attenuate one or more frequency components of the data signal based on a characteristic the equalizer control signal.

* * * * *

UNITED STATES PATENT AND TRADEMARK OFFICE
CERTIFICATE OF CORRECTION

PATENT NO. : 10,033,555 B2
APPLICATION NO. : 15/265275
DATED : July 24, 2018
INVENTOR(S) : Robert Schell Page 1 of 1

It is certified that error appears in the above-identified patent and that said Letters Patent is hereby corrected as shown below:

In the Claims

In Column 18, Line 44, in Claim 1, delete "rates;" and insert --rates,-- therefor In Column 19, Line 24, in Claim 8, delete "leak" and insert --least-- therefor In Column 20, Line 28, in Claim 17, delete "signal;" and insert --signal,-- therefor Signed and Sealed this
Twenty-eighth Day of May, 2019

Andrei Iancu
*Director of the United States Patent and Trademark Office*